US 11,248,524 B2

United States Patent
Djelassi

(10) Patent No.: US 11,248,524 B2
(45) Date of Patent: Feb. 15, 2022

(54) UNIT FOR CONTROLLING A CONTROLLED VALVE FOR ABSTRACTING AN AIRFLOW FROM A PRESSURIZED AIRFLOW OF AN AIRCRAFT

(71) Applicant: SAFRAN AIRCRAFT ENGINES, Paris (FR)

(72) Inventor: Cedrik Djelassi, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 123 days.

(21) Appl. No.: 16/637,885

(22) PCT Filed: Jul. 26, 2018

(86) PCT No.: PCT/FR2018/051918
§ 371 (c)(1),
(2) Date: Feb. 10, 2020

(87) PCT Pub. No.: WO2019/030441
PCT Pub. Date: Feb. 14, 2019

(65) Prior Publication Data
US 2020/0217249 A1    Jul. 9, 2020

(30) Foreign Application Priority Data
Aug. 11, 2017 (FR) .................................. 17 57654

(51) Int. Cl.
*F02C 6/08* (2006.01)
*F02C 9/18* (2006.01)
(Continued)

(52) U.S. Cl.
CPC .................. *F02C 6/08* (2013.01); *F02C 9/18* (2013.01); *B64D 2013/0618* (2013.01);
(Continued)

(58) Field of Classification Search
CPC ... F02C 6/08; F02C 9/18; F02C 7/185; B64D 2013/0618; F05D 2220/323;
(Continued)

(56) References Cited

U.S. PATENT DOCUMENTS 4,453,378 A * 6/1984 Zagranski ............ G05D 1/0858
60/39.281
4,490,797 A * 12/1984 Staggs ..................... G09G 5/06
345/23

(Continued)

FOREIGN PATENT DOCUMENTS

EP    0 511 935 A1    11/1992
FR    2 987 123 A1    1/2013

OTHER PUBLICATIONS

International Search Report dated Nov. 12, 2018 in PCT/FR2018/051918 filed on Jul. 26, 2018.

*Primary Examiner* — Craig Kim
(74) *Attorney, Agent, or Firm* — Oblon, McClelland, Maier & Neustadt, L.L.P.

(57) ABSTRACT

A system for regulating a thermal parameter associated with a heat exchange assembly of a turbomachine includes at least one device for measuring or estimating the thermal parameter, a controlled valve acting on the flow rate of a fluid in the assembly, and a regulator including a comparator determining the sign of an error signal relating to the difference between the thermal parameter and a setpoint. The regulator further includes a switch configured to deliver, based on the sign, to a valve control system, a maximum control current switching the valve in a closed state or a minimum control current switching the valve in an open state, and a phase-shifter configured to apply on the error signal a phase advance determined from an estimate of a time constant of the control system.

13 Claims, 2 Drawing Sheets

(51) Int. Cl.
 *B64D 13/06* (2006.01)
 *F02C 7/18* (2006.01)
 *F28D 21/00* (2006.01)

(52) U.S. Cl.
 CPC ........ *F02C 7/185* (2013.01); *F05D 2220/323* (2013.01); *F05D 2260/213* (2013.01); *F05D 2270/101* (2013.01); *F05D 2270/303* (2013.01); *F28D 2021/0021* (2013.01)

(58) Field of Classification Search
 CPC ......... F05D 2260/213; F05D 2270/101; F05D 2270/303; F28D 2021/0021
 See application file for complete search history.

(56) References Cited

U.S. PATENT DOCUMENTS

| | | | | |
|---|---|---|---|---|
| 4,651,518 A * | 3/1987 | McLaughlin | ............ | F02C 9/28 60/39.281 |
| 4,809,500 A * | 3/1989 | Roberts, Jr. | ............... | F02C 9/28 60/235 |
| 4,928,482 A * | 5/1990 | Pollak | ...................... | F02C 9/28 60/39.27 |
| 4,995,232 A * | 2/1991 | Sutton | ....................... | F02C 9/28 60/243 |
| 5,134,845 A * | 8/1992 | Romano | .................... | F02C 9/28 60/39.281 |
| 5,161,364 A | 11/1992 | Bruun et al. | | |
| 6,442,942 B1 * | 9/2002 | Kopko | ....................... | F02C 9/28 60/773 |
| 8,321,104 B2 * | 11/2012 | Mahmood | ............... | F01D 11/24 701/60 |
| 9,206,746 B2 * | 12/2015 | Djelassi | ..................... | F02K 1/17 |
| 9,625,886 B1 * | 4/2017 | Garg | ......................... | G05B 9/02 |
| 10,221,776 B2 * | 3/2019 | Meunier | ................... | F02C 9/28 |
| 2003/0052652 A1 * | 3/2003 | Andres | ................... | F01D 15/10 322/28 |
| 2009/0149122 A1 * | 6/2009 | Barbara | ................. | B64D 13/06 454/76 |
| 2014/0083106 A1 * | 3/2014 | Mackin | ................. | F28D 9/0062 60/772 |
| 2014/0199158 A1 * | 7/2014 | Sebaa | ....................... | F02C 9/18 415/1 |
| 2018/0010526 A1 * | 1/2018 | Mori | ......................... | F02C 3/04 |
| 2018/0094584 A1 * | 4/2018 | Chalaud | .................. | F25B 41/20 |
| 2020/0131989 A1 * | 4/2020 | Toshima | .................. | F02C 6/16 |

\* cited by examiner

UNIT FOR CONTROLLING A CONTROLLED VALVE FOR ABSTRACTING AN AIRFLOW FROM A PRESSURIZED AIRFLOW OF AN AIRCRAFT

BACKGROUND OF THE INVENTION

The invention relates to the general field of turbomachines for aeronautical gas turbine engines. It concerns more particularly the regulation of the supply temperature of an air bleed system for an aircraft.

An aircraft, such as an airplane, comprises a fuselage in which a cockpit and a passenger cabin are arranged, and at least one turbomachine. Such a turbomachine comprises an engine and a fan at which air bleeds can be performed. Such bleeds are carried out by a system called bleed system, comprising a plurality of valves and a heat exchanger. These valves allow air bleed from various air streams circulating in the engine, in particular a high-pressure high-temperature air stream, bled from a pressurized air stream from at least one compressor stage of the engine, and a cold fan air stream, bled downstream of the fan, for example in a secondary flowpath where a cold air stream circulates. The high-pressure air stream and the fan air stream can be delivered to the heat exchanger to allow lowering the temperature of the high-pressure air stream at the outlet of the exchanger so as to regulate the temperature of the air sent to the airplane system. Another part of the bled air can be used to supply the deicing systems of the airplane.

Such regulation is obtained by the monitoring of the opening of one or several of the air stream bleed valves. The temperature of the air stream can be regulated by the selection of one or several valve(s) to be monitored, for example, by the monitoring of the opening or closing of the valve for bleeding the fan air stream.

An air stream can also be bled for an LPTACC (Low pressure Turbine Active Clearance Control) system to regulate the clearance between, on the one hand, the tips of the movable blades of a turbine rotor and, on the other hand, a turbine ring of an outer casing surrounding the blades. The clearance existing between the tip of the blades of a turbine and the ring which surrounds them is dependent on the differences in dimensional variations between the rotating parts such as the disc and the blades forming the turbine rotor and the stationary parts such as the outer casing including the turbine ring it comprises. Some of the dimensional variations are related to the temperature variations of the blades, disc and casing, and others are related to the mechanical effect of the centrifugal force exerted on the turbine rotor. However, to increase the performance of a turbine, it is desirable to minimize the clearance as much as possible. During an increase in speed, for example during the transition from a ground idle speed to a take-off speed in a turbomachine for an aeronautical engine, the centrifugal force exerted on the turbine rotor tends to bring the blade tips of the turbine ring before the turbine ring have had time to expand under the effect of the increase in temperature related to the increase in speed which generates a risk of contact.

To regulate the clearance, it is known to use an active control system using the emission of an air stream, bled for example at a compressor and/or downstream of the fan of the turbomachine, on the outer surface of the turbine ring. Fresh air sent to the outer surface of the turbine ring has the effect of cooling the latter and thus of limiting its thermal expansion which makes it possible to minimize the clearance, and conversely, hot air promotes the thermal expansion of the turbine ring, which increases the clearance and makes it possible, for example, to avoid contact between the blade tips and the ring.

The regulation is carried out using a control unit that acts on a position-regulated valve to control the flow rate and/or the temperature of air directed on the turbine ring, based on a clearance setpoint and on an estimate of the actual blade tip clearance.

An air stream can also be bled for an inter-flowpath core compartment cooling system of a turbofan engine. The system comprises valves bleeding cooling air from the air stream at the outlet of the fan and a cooling manifold to ensure the cooling of the control members and accessories located in a core housing of the turbomachine, between the primary flowpath and secondary flowpath.

Generally, the cold air supplying the exchanger is bled from the secondary stream downstream of the fan, via a scoop-valve with a variable-inlet section designated by the abbreviation FAV for Fan Air Valve.

It is the control of the angular position of a shutter of this valve, formed for example by one or two pivoting flap(s), which allows adjusting the cold air flow rate bled by the FAV for the exchanger and therefore allows the regulation thermal of the air delivered to the airplane at the outlet of the exchanger, the temperature being generally designated by the expression "temperature bleed" for the regulation systems called bleed systems.

In the considered example, the FAV system consists of a system of two flaps mechanically connected to a pneumatic cylinder that allows opening or closing these flaps. The cylinder is supplied with air by a torque motor which pressurizes a supply chamber, the torque motor being supplied by a pressure called regulated "muscle" pressure.

The regulation carried out using this FAV valve however poses problems which arise from the valve itself, in particular in the case where such a FAV system does not have a flap position feedback that allows knowing the position of the flaps. On the other hand, the dispersion related to the manufacture and the one linked to the environmental conditions generate significant variability in the law connecting the control current sent to the torque motor and the position of the flaps.

The relationship between the flap control current and the position of the scoop-valve flaps therefore has significant variability which can be illustrated in FIG. 1 which presents a graph expressing the position of the flaps based on the control current.

On the graph in FIG. 1, for a current having a value, in milliamperes, corresponding to the abscissa B, the flaps can be closed or open according to the variation of the law as illustrated by the left characteristic of the valve and the right characteristic of the graph. In other words, the value of the control current to be sent for the flaps of the scoop-valve to be closed can vary, or shift, from the value corresponding to the abscissa B to the value corresponding to the abscissa of the point C.

Indeed, as illustrated in FIG. 1, the current for closing the valve (B mA) in the extreme left characteristic of the valve corresponds to a value for which the flaps are open in the extreme right characteristic.

The problem of monitoring the control current to be sent therefore comes directly from this feature. Indeed, any corrector having an integrator will be forced to undergo the dead current ranges.

For example, in the case of a controller undergoing a valve having a characteristic such as the one on the left in the graph of FIG. 1, starting from a control current corresponding to the maximum current, that is to say with a value corresponding to that of the abscissa C, thereby with a regulator in control saturation, the scoop-valve is closed according to the control law. If the opening of the scoop-valve is necessary to regulate the air temperature for the bleed system, the control device must reach a current having a value corresponding to the abscissa B to start seeing the valve move. The gains of the corrector cannot be adapted to the position of the valve, because this position is unknown, which leads to very slowly crossing the dead area of the scoop-valve. This implies a very slow response time of the regulation.

The regulators recommended in the state of the art for this type of monitoring are generally PID-type, that is to say Proportional Integral Derivative-type, correctors.

An air bleed management system for the bleed system with control of a FAV scoop-valve is known from the document FR 2978123. The system described in this document presents a particular management of the temperature information provided by probes but does not present any regulation.

A control device, or controller, with a linear-quadratic regulator for the control of a FAV comprising an actuator, is also known. The controller sends position control signals to the actuator, but does not take into account the variability of a signal control law based on the position of the FAV flaps.

OBJECT AND SUMMARY OF THE INVENTION

The invention aims at overcoming the drawbacks mentioned above in particular the variability of the control law connecting the control current to be delivered to the position of the flaps of the controlled valve, the variability of the control law generating dead control ranges, by providing a control unit for regulating the temperature of the bled stream making it possible to compensate for the dead range of the control current of the control law of the controlled valve.

One object of the invention proposes a system for regulating a thermal parameter associated with a heat exchange assembly of a turbomachine, comprising:
  at least one means for measuring or estimating said thermal parameter,
  a valve controlled by an at least partly electric control system, the valve including a shutter, formed for example by at least one flap, said shutter being configured to vary the flow rate of passage of a fluid in said heat exchange assembly in order to affect said thermal parameter, and
  a regulator comprising a comparator configured to determine the positive or negative sign of an error signal relating to the difference between a value of the thermal parameter measured or estimated by said means and a setpoint.

According to a general characteristic of the invention, the regulator further comprises:
  a switch coupled at the outlet of the comparator and configured to deliver to the valve control system a maximum control current or a minimum control current based on the positive or negative sign of the error signal, the maximum control current making it possible to switch the shutter of said valve in a first position defining a fully closed state of the valve and the minimum control current making it possible to switch the shutter of said valve in a second position defining a fully open state of the valve, and
  a phase-shifter configured to apply on the error signal a phase advance which is determined based on an estimate of a time constant of the valve control system.

The valve control system can be an electro-pneumatic system like those described in the document FR 2 774 357. The control system can thus be a torque motor of the valve which actuates the cylinder making it possible to modify the position of the flaps in the case where the shutter is formed by at least two flaps. The control system and the valve can be integrated in the same block.

The regulator of the regulation system is thus configured to operate in all-or-nothing mode. The use of an all-or-nothing type regulator with a phase lead provides ideal performances for an air bleed system of an aircraft, as well as extremely simple adjustment.

An all-or-nothing type regulator used alone in a control unit for the regulation of the temperature of the air output from a bleed system in an aircraft would have the major drawback of leading to a potentially significant exceedance of the temperature setpoint. Indeed, with an all-or-nothing type regulator for controlling the valve, the control is reversed only when the setpoint temperature is equaled or exceeded. The response time of the bleed system, in particular of the valve, can thus generate a significant exceedance, beyond the setpoint temperature, of the temperature of the air delivered to the airplane at the outlet of the exchanger, that is to say the temperature to be regulated which is measured or estimated by an appropriate means.

The $(1+\tau p)$-type phase lead, with $\tau$ a time constant of a system and $p$ the signal, applied on the signal supplying the comparator of the control unit, i.e. on the signal resulting from the difference between the setpoint temperature and the measured temperature, allows overcoming this problem.

The phase lead is determined by determining a derivative of the temperature, that is to say a temperature gradient, and by applying this gradient to the value of the temperature difference existing between the measured temperature and the setpoint temperature. Thus, it is possible to anticipate the instant at which the setpoint temperature is likely to be exceeded by the actual (measured or estimated) temperature and to control the switching of the control current in advance, that is to say before the actual temperature has exceeded the setpoint temperature.

If the time constant of the valve control system can be estimated in real time, it can be used directly as the time constant in the phase lead to adjust the time advance based on the operating parameters of the turbomachine.

According to one embodiment, the means for measuring or estimating the thermal parameter can be a temperature sensor configured to measure the temperature of the air output from a heat exchanger of the heat exchange assembly.

According to a first aspect of the regulation system, the phase-shifter may comprise a diverter configured to provide a time derivative of the error signal, the phase lead applied on the error signal at a given instant being calculated by multiplying the time constant by the time derivative at this instant.

According to a second aspect of the regulation system, the phase-shifter may comprise an amplifier configured to apply to the time constant of said valve control system a positive adjustment gain less than or equal to one.

The time constant of the valve is applied modulo an adjustment constant called adjustment gain. The adjustment gain allows adjusting the phase lead based on the correction desired by the control unit. A gain of 1 provides a maximum phase lead, which regularly switches the current control. A gain less than 1 allows limiting the switching frequency of the control and thus lengthening the service life of the valve.

Preferably, the adjustment gain is comprised between 0.4 and 0.6.

According to a third aspect of the regulation system, the valve control system comprises a valve member actuated by an electric motor, as well as pneumatic control means controlled by the valve member and able to actuate the opening and closing of the valve.

According to a fourth aspect of the regulation system, the fluid supplying said heat exchange assembly is air bled downstream of a fan of the turbomachine and is intended to cool the heat exchange assembly.

According to a fifth aspect of the regulation system, the heat exchange assembly can include:
- a first duct bleeding a first pressurized air stream downstream of a compression stage of the turbomachine,
- a second duct bleeding a second air stream formed by said air bled downstream of the fan, the temperature of the second bled air stream being lower than the temperature of the first bled air stream,
- a heat exchanger to which said first and second ducts are connected, said heat exchanger being able to lower the temperature of the first air stream at the outlet of the exchanger by heat exchange with the second air stream, the regulation system comprising a temperature sensor adapted to measure said thermal parameter, the thermal parameter corresponding to the temperature of the first air stream in the first duct at the outlet of the heat exchanger, said valve being coupled to the second duct so as to vary the flow rate of the second air stream in order to regulate said temperature of the first air stream in the first duct at the outlet of the heat exchanger.

In one variant of the regulation system, the heat exchange assembly may comprise:
- at least one duct for bleeding said fluid, the fluid including air bled downstream of a fan of the turbomachine and/or downstream of a compression stage of the turbomachine, and
- a turbine ring having an outer surface able to be ventilated by said bled air so as to modify the temperature of said ring,
said valve being arranged so as to vary the bled air flow rate, in order to control a clearance of turbine blade tips by a regulation of the thermal parameter consisting of the state of expansion of the turbine ring.

In another object, a method for regulating a thermal parameter associated with a heat exchange assembly of a turbomachine is proposed, the method being intended to be implemented in a regulation system which comprises at least one means for measuring or estimating said thermal parameter, a valve controlled by an at least partly electric control system, the valve including a shutter configured to vary the flow rate of passage of a fluid in said heat exchange assembly in order to affect said thermal parameter.

According to a general characteristic of this object, the method comprises:
- a comparison step in which the positive or negative sign of an error signal relating to the difference between a value of the thermal parameter measured or estimated by said means and a setpoint, is determined,
- a control current switching step in which a maximum control current or a minimum control current is delivered to the valve control system based on the positive or negative sign of the error signal, the maximum control current making it possible to switch the shutter of said valve in a first position defining a fully closed state of the valve and the minimum control current making it possible to switch the shutter of said valve in a second position defining a fully open state of the valve, and
- a phase-shifting step in which a phase advance determined from an estimate of a time constant of the valve control system is applied on the error signal, the phase-shifting step preceding the comparison step.

According to a first aspect of the regulation method, the phase-shifting step may comprise a derivation sub-step in which a time derivative of the error signal is calculated, the phase lead applied on the error signal at a given instant being calculated by multiplying the time constant by said time derivative at this instant.

According to a second aspect of the control method, the phase-shifting step may comprise an amplification sub-step in which a positive adjustment gain less than or equal to one is applied to the time constant of said valve control system.

Preferably, the adjustment gain is comprised between 0.4 and 0.6.

In another object, a turbomachine of an aircraft comprising a system for regulating a thermal parameter is proposed.

BRIEF DESCRIPTION OF THE DRAWINGS

The invention will be better understood upon reading the following, for illustrative purposes and without limitation, with reference to the appended drawings in which.

DETAILED DESCRIPTION OF EMBODIMENTS

Figure 1:
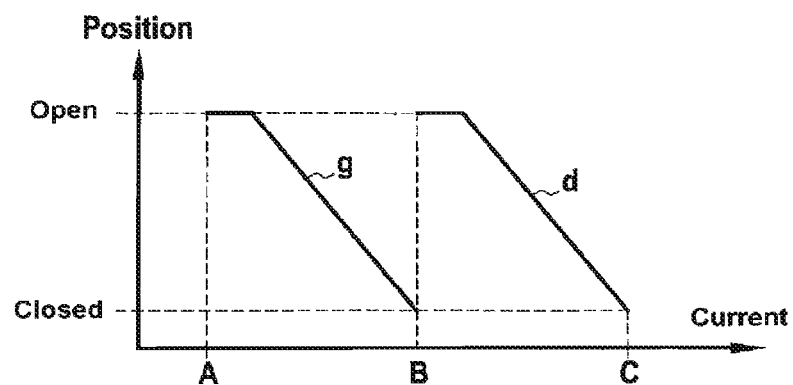
FIG. 1 represents a graph expressing the position of the flaps based on the control current according to the state of the art.
Figure 2:
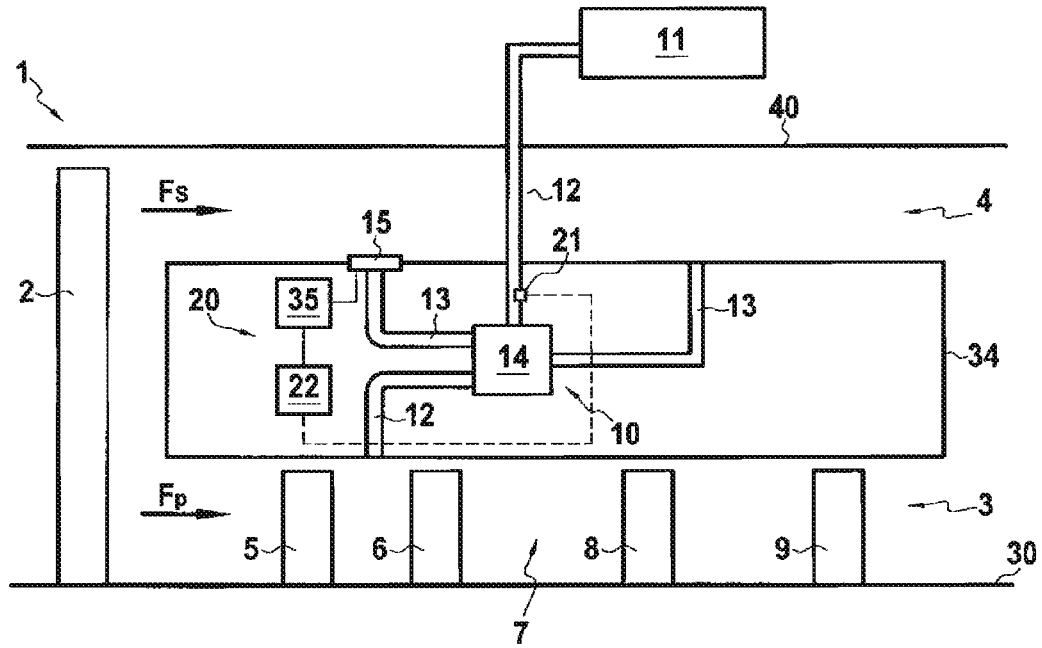
FIG. 2 schematically represents a turbomachine provided with a heat exchange assembly according to one embodiment of the invention.

FIG. 2 schematically represents a turbomachine 1 of an aircraft provided with a heat exchange assembly according to one embodiment of the invention.

The turbojet engine 1 is of the turbofan and double-body type and has a longitudinal axis X. The turbojet engine comprises in particular a fan 2 which delivers an air stream divided into a primary stream $F_P$ flowing in a primary flowpath 3 of the primary stream $F_P$ and into a secondary stream $F_S$ flowing in a secondary flowpath 4 of the secondary stream $F_S$ coaxial with the primary flowpath 3. The primary flowpath 3 extends between a core shroud 30 and an inter-flowpath compartment 34, and the secondary flowpath 4 extends between the inter-flowpath compartment 34 and an outer shroud 40. From upstream to downstream in the direction of flow of the primary stream $F_P$, the primary flowpath 3 comprises a low-pressure compressor 5, a high-pressure compressor 6, a combustion chamber 7, a high-pressure turbine 8 and a low-pressure turbine 9.

The turbojet engine 1 comprises a heat exchange assembly 10 mounted in the inter-flowpath compartment 34. The heat exchange assembly 10 comprises a system for bleeding a hot air stream and a cold air stream, configured to cool the hot air with the cold air and provide at the outlet of the heat exchange assembly 10 a cooled air regulated to a desired temperature and a desired pressure for installations 11 of the aircraft and/or of the turbomachine using such air, such as for example the installation for conditioning the air of the aircraft cabin, the installation for de-icing the aerodynamic surfaces of the turbomachine, etc.

The heat exchange assembly 10 comprises a hot air bleed duct 12, a cold air bleed duct 13 and a heat exchanger 14.

The hot air bleed duct 12 fluidly connects the primary flowpath 3, and more particularly at a compression stage 5 or 6, to the installations 11 via the heat exchanger 14. The hot air bleed duct 12 thus bleeds a portion of the primary stream $F_p$ and conveys it to the installations 11 via the heat exchanger 14. The hot air bleed duct 12 opens into the primary flowpath 3 at a compression stage 5 or 6 and thus connects the latter to the inlet of the heat exchanger 14.

The cold air bleed duct 13 bleeds a portion of the secondary stream $F_S$ in the secondary flowpath 4 and, after having passed through the heat exchanger 14, delivers the portion of air thus bled from the secondary flowpath downstream of the bleed location relative to the direction of the secondary stream $F_S$. The cold air bleed duct 13 opens for a first time into the secondary flowpath 4 to bleed a portion of the secondary stream $F_S$ and opens for a second time into the secondary flowpath 4 to re-inject the portion of stream thus bled from the secondary stream $F_S$ downstream of the bleed location after having been heated during the passage through the heat exchanger 4. The cold air bleed duct 13 thus puts the secondary flowpath 4 receiving the secondary stream $F_S$ delivered by the fan 2 in communication with the heat exchanger 14.

The cold air coming from the fan 2 thus transversely passes through the heat exchanger 14 to cool the hot air bled from the compressor stage 4 and circulating in the exchanger 14 from its inlet to its outlet. The hot air circulating in the hot air bleed duct 12 and the cold air circulating in the cold air bleed duct 13 remain in separate ducts within the heat exchanger 14 and never mix.

To bleed the cold air stream from the secondary flowpath 4, the heat exchange assembly 10 comprises a controlled valve 15 of the scoop-valve type mounted on the air intake provided in the inter-flowpath compartment 34. The valve 15 comprises mechanical flaps actuated by a cylinder controlled by a control system 35 including a torque motor.

The valve 15, and more particularly the torque motor 35 of the valve 15, is controlled by a control unit 20.

The control unit 20 comprises a temperature sensor 21 mounted in the hot air bleed duct 12 on a portion of the duct extending between the heat exchanger 14 and the installations 11, and a regulator 22 of the temperature of the air stream output from the heat exchanger 14.

The temperature sensor 21 is configured to measure the temperature of the air stream delivered to the installations 11, that is to say the temperature of the hot air stream circulating in the hot air bleed duct 12 at the outlet of the heat exchanger 14.

Figure 3:
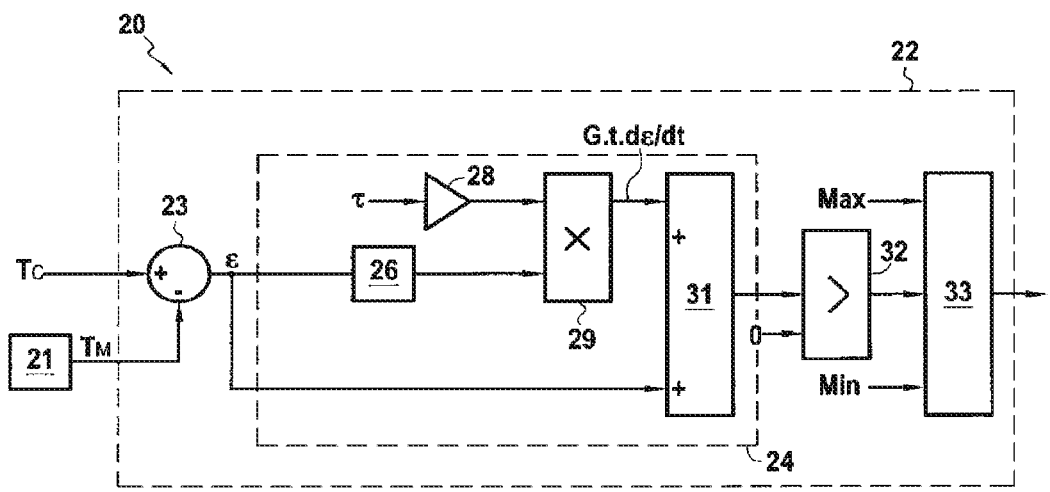
FIG. 3 schematically represents a control unit according to one embodiment of the invention.

As schematically illustrated in FIG. 3, the regulator 22 is of the all-or-nothing type and comprises a subtractor 23 receiving as input a temperature setpoint $T_C$ and a measurement of the actual temperature $T_M$ delivered by the temperature sensor 21. The subtractor 23 is configured to determine the error $\varepsilon$, that is to say the difference, between the setpoint temperature $T_C$ and the measured temperature $T_M$.

The regulator 22 further comprises a phase lead module, or phase-shifter 24, including a bypass block 26, an amplifier 28, a multiplier 29 and an adder 31.

The bypass block 26, or diverter, calculates from the error signal $\varepsilon$ delivered by the subtractor 23 the time derivative of the error signal $d\varepsilon/dt$. The diverter 26 delivers the time derivative of the error signal $d\varepsilon/dt$ to the multiplier 29.

The amplifier 28 receives as input a time constant corresponding to the time constant $\tau$ of the torque motor 35 of the controlled valve 15. The amplifier 28 applies a positive adjustment gain G less than or equal to one to the time constant $\tau$ received as input and outputs a signal corresponding to the multiplication of the time constant $\tau$ with the gain G and with the time derivative of the error signal $d\varepsilon/dt$.

The adjustment gain allows adjusting the phase lead. A gain of 1 allows a maximum phase lead for this type of regulator 22, which will cycle the control a lot. A gain less than 1 allows limiting the cycle frequency and thus lengthens the service life of the valve 15. A gain of 0.5 brings a good compromise between regulation performance and cycle frequency of the control.

The adder 31 receives as input the signal delivered by the multiplier 29 and the error signal $\varepsilon$ delivered by the subtractor 23, and thus outputs an error signal with a phase lead.

The regulator 22 further comprises a comparator 32 and a switch 33. The signal resulting from the adder 31 is sent to the comparator 32 which determines the sign of the resulting signal delivered by the adder 31 of the phase-shifter 24. The sign is then output from the comparator 32 to the switch 33 configured to output a control current value of the torque motor 35 of the valve 15 capable of switching between a first value corresponding to a minimum current Min and a second value corresponding to a maximum current Max.

The high-pressure turbine 8 of the turbojet engine 1 comprises a rotor formed of a disc on which a plurality of movable blades disposed in the primary flowpath 3, are mounted. The rotor is surrounded by a turbine casing comprising a turbine ring carried by an outer turbine casing by means of fixing spacers.

The turbine ring can be formed of a plurality of adjacent sectors or segments. On the internal side, it is provided with a layer of abradable material and surrounds the rotor blades by arranging a clearance with the tips of said blades.

The turbojet engine 1 can further comprise a secondary air bleed system, similar to the heat exchange assembly 10 and not represented in FIG. 2, making it possible to control the clearance by modifying in a controlled manner the internal diameter of the outer turbine casing. To this end, a control unit, similar to the control unit 20 of the heat exchange assembly 10, monitors the bled air flow rate in order to vary the temperature of the air directed towards the outer turbine casing and thus control a clearance of turbine blade tips by a regulation of the thermal parameter consisting of the state of expansion of the turbine ring.

Figure 4:
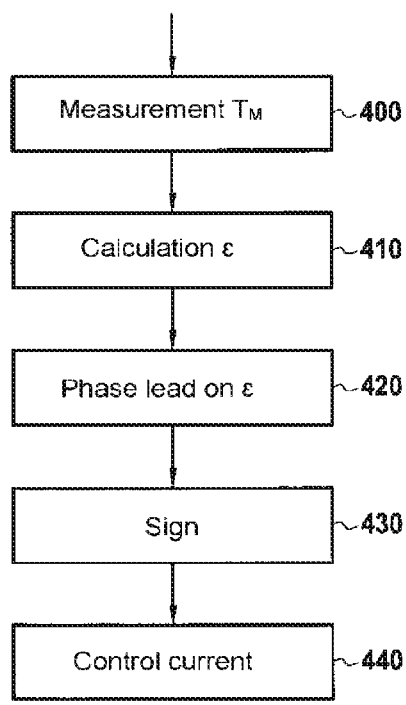
FIG. 4 presents a flowchart of a control method according to one mode of implementation of the invention.

FIG. 4 illustrates a flowchart of a method for controlling a controlled valve for bleeding an air stream in a pressurized air stream of an aircraft according to one mode of implementation of the invention.

In a first step 400, the temperature sensor 21 of the control unit 20 performs a measurement of the temperature $T_M$ of the gas stream circulating in the hot air duct 12 at the outlet of the heat exchanger 14.

In a next step 410, the regulator 22 of the control unit 20 calculates the difference $\varepsilon$ existing between the setpoint temperature $T_C$ and the measured temperature $T_M$ in the preceding step 400.

In a next step 420, the regulator applies a phase lead on the difference $\varepsilon$ calculated in the preceding step 410.

In a next step 430, the sign of the signal relating to the error $\varepsilon$ to which the phase lead has been applied is determined by the comparator 32 of the regulator 22.

The sign determined in the preceding step 430 is then delivered to the switch 33 which outputs a control current whose value corresponds to a maximum value for opening the flaps of the valve 15 or to a minimum value for closing the flaps of the valve 15.

The invention allows providing a control unit for regulating the temperature of the bled stream making it possible to compensate for the dead range of the control current of the control law of the controlled valve.

The invention claimed is:

1. A system for regulating a thermal parameter associated with a heat exchange assembly of a turbomachine, comprising:
   at least one means for measuring or estimating said thermal parameter,
   a valve controlled by an at least partly electric control system, the valve including a shutter, formed for example by at least one flap, said shutter being configured to vary the flow rate of passage of a fluid in said heat exchange assembly in order to affect said thermal parameter, and
   a regulator comprising a comparator configured to determine the positive or negative sign of an error signal relating to the difference between a value of the thermal parameter measured or estimated by said means and a setpoint,
   wherein the regulator further comprises:
   a switch coupled to the output of the comparator and configured to deliver to the valve control system a maximum control current or a minimum control current based on the positive or negative sign of the error signal, the maximum control current making it possible to switch the shutter of said valve in a first position defining a fully closed state of the valve and the minimum control current making it possible to switch the shutter of said valve in a second position defining a fully open state of the valve, and
   a phase-shifter configured to apply on the error signal a phase advance determined from an estimate of a time constant of the valve control system.

2. The regulation system according to claim 1, wherein the phase-shifter comprises a diverter configured to provide a time derivative of the error signal, the phase lead applied on the error signal at a given instant being calculated by multiplying the time constant by the time derivative at this instant.

3. The regulation system according to claim 1, wherein the phase-shifter comprises an amplifier configured to apply to the time constant of said valve control system a positive adjustment gain less than or equal to one.

4. The regulation system according to claim 3, wherein the adjustment gain is comprised between 0.4 and 0.6.

5. The regulation system according to claim 1, wherein the valve control system comprises a valve member actuated by an electric motor, as well as pneumatic control means controlled by the valve member and able to actuate the opening and closing of the valve.

6. A turbomachine of an aircraft, comprising a heat exchange assembly and a system for regulating a thermal parameter associated with said heat exchange assembly according to claim 1.

7. The turbomachine according to claim 6, wherein the fluid supplying said heat exchange assembly which thermal parameter is regulated by said regulation system is air led downstream of a fan of the turbomachine and is intended to cool the heat exchange assembly.

8. The turbomachine according to claim 7, wherein the heat exchange assembly which thermal parameter is regulated by said regulation system comprises:
   a first duct bleeding a first pressurized air stream downstream of a compression stage of the turbomachine,
   a second duct bleeding a second air stream formed by said air bled downstream of the fan, the temperature of the second bled air stream being lower than the temperature of the first bled air stream,
   a heat exchanger to which said first and second ducts are connected, said heat exchanger being able to lower the temperature of the first air stream at the outlet of the exchanger by heat exchange with the second air stream,
   the regulation system further comprising a temperature sensor adapted to measure said thermal parameter, the thermal parameter corresponding to the temperature of the first air stream in the first duct at the outlet of the heat exchanger, and
   said valve of said regulation system being coupled to the second duct so as to vary the flow rate of the second air stream in order to regulate said temperature of the first air stream in the first duct at the outlet of the heat exchanger.

9. The turbomachine according to claim 6, wherein the heat exchange assembly comprises:
   at least one duct for bleeding said fluid, the fluid including air bled downstream of a fan of the turbomachine and/or downstream of a compression stage of the turbomachine, and
   a turbine ring having an outer surface able to be ventilated by said bled air so as to modify the temperature of said ring,
   said valve being arranged so as to vary the bled air flow rate, in order to control a clearance of turbine blade tips by a regulation of the thermal parameter consisting of the state of expansion of the turbine ring.

10. A method for regulating a thermal parameter associated with a heat exchange assembly of a turbomachine, the method being intended to be implemented in a regulation system which comprises at least one means for measuring or estimating said thermal parameter, a valve controlled by an at least partly electric control system, the valve including a shutter configured to vary the flow rate of passage of a fluid in said heat exchange assembly in order to affect said thermal parameter,
   the method comprising:
   comparing in which the positive or negative sign of an error signal relating to the difference between a value of the thermal parameter measured or estimated by said measurement and estimation means and a setpoint is determined,
   control current switching in which a maximum control current or a minimum control current is delivered to the valve control system based on the positive or negative sign of the error signal, the maximum control current making it possible to switch the shutter of said valve in a first position defining a fully closed state of the valve and the minimum control current making it possible to switch the shutter of said valve in a second position defining a fully open state of the valve, and
   phase-shifting in which a phase advance determined from an estimate of a time constant of the valve control system is applied on the error signal, the phase-shifting preceding the comparing.

11. The method according to claim 10, wherein the phase-shifting comprises a derivation sub-step in which a time derivative of the error signal is calculated, the phase lead applied on the error signal at a given instant being calculated by multiplying the time constant by said time derivative at this instant.

12. The method according to claim 10, wherein the phase-shifting comprises an amplification sub-step in which a positive adjustment gain less than or equal to one is applied to the time constant of said valve control system.

13. The method according to claim 12, wherein the adjustment gain is comprised between 0.4 and 0.6.

* * * * *